United States Patent [19]

Liu et al.

[11] Patent Number: 5,596,481
[45] Date of Patent: Jan. 21, 1997

[54] INTEGRATED ERGONOMIC PALM REST FOR NOTEBOOK COMPUTER

[75] Inventors: Peter M. Liu, Austin; Robert L. McMahan, Cedar Park, both of Tex.

[73] Assignee: Dell USA, L.P., Austin, Tex.

[21] Appl. No.: 511,948

[22] Filed: Aug. 7, 1995

[51] Int. Cl.$^6$ ................................ G06F 1/16; H05K 7/16
[52] U.S. Cl. ...................... 361/683; 361/680; 248/118.3; 248/118.1; 400/715
[58] Field of Search ..................................... 361/679, 680, 361/681, 683; 248/118, 118.1, 118.3, 118.5, 918; 400/714, 715, 691; 364/708.1; G06F 1/16

[56] References Cited

U.S. PATENT DOCUMENTS

| | | | |
|---|---|---|---|
| 5,346,164 | 9/1994 | Allen | 248/118 |
| 5,375,800 | 12/1994 | Wilcox et al. | 248/118.1 |
| 5,443,320 | 8/1995 | Agata et al. | 400/715 |
| 5,513,824 | 5/1996 | Leavitt et al. | 248/118.3 |

*Primary Examiner*—Leo P. Picard
*Assistant Examiner*—Lynn D. Feild
*Attorney, Agent, or Firm*—Mark P. Kahler; Henry N. Garrana

[57] ABSTRACT

The present invention provides a portable computer having a palm rest integrated therein that allows the user to maintain a wrist-neutral position when using the portable computer. The portable computer comprises a computer chassis having a side wall adjoining a bottom that forms a footprint of the chassis, a keyboard positioned toward a rear end of the chassis, and a cover member covering a portion of an interior of the chassis. The portable computer further includes a palm rest integrated into the structure of the portable computer's chassis. The palm rest is comprised of a palm support that has front and rear ends and that is pivotable with respect to the chassis between a covering position and an elevated first palm support position. The palm support is pivotable about a hinge, that couples the palm support to the chassis. The palm rest further includes an adjustable extension structure having a first end coupled to the palm support and a second end coupled to a wall of the chassis. The adjustable extension is pivotally coupled to the palm support adjacent a front end of the palm support.

39 Claims, 4 Drawing Sheets

INTEGRATED ERGONOMIC PALM REST FOR NOTEBOOK COMPUTER

TECHNICAL FIELD OF THE INVENTION

The present invention is directed, in general, to portable computers, and more specifically to a notebook computer having an integrated ergonomic palm rest associated therewith.

BACKGROUND OF THE INVENTION

The use of and advantages associated with portable computers are well known in the art. Over the last decade, there has been an intense effort in the computer industry to down size the personal computer ("PC") to provide users with a powerful yet portable computer that can be taken out of the office and fully utilized at home or on the road. As advancements have been made in both microprocessing chip and battery technologies, particularly over the last decade, PCs were eventually downsized into "laptop computers". While these computers offered the portability and processing power of a full sized PC, the laptop was still somewhat large and heavy for the user to carry around. In response to these disadvantages, the laptops were downsized even further into what is now commonly known in the industry as a notebook computer, which is smaller and more light weight yet possessing equal or greater processing capabilities than their earlier laptop counterpart.

Because of their portability, notebook computers are frequently used in various places that require the user to operate the notebook computer from their lap, hence their name for their earlier counterpart. In such instances, the user must type with his or her wrists bent upwardly at an unnatural angle. This can lead to or exacerbate any pre-existing condition resulting from prolonged typing operations, such as tunnel carpel syndrome ("CTS") or other typing-related injury that the user may have.

CTS has become a major problem with respect to individuals who do extensive amounts of typing during their typical work day. CTS is caused by cumulative damage to the finger tendons as they pass through a two to three centimeter (2–3 cm) long, narrow, rigid channel in the wrist, the carpal tunnel. With the hand oriented palm down, the roof of the carpal tunnel is formed by the arch of the carpal bones and the floor by the tough transverse carpal ligament. The carpal tunnel contains the tendons for the fingers, the radial artery, and the median nerve which transmits sensation for the thumb and the first 2.5 fingers. Sensation for the remaining 1.5 digits is transmitted via the ulnar nerve which runs outside of the carpal tunnel.

As the hand deviates from normal either (i) horizontally either towards the thumb (radial deviation) or towards the little finger (ulnar deviation), or (ii) vertically up or down; the pressure on the carpal tunnel increases. Vertical deviations (extension/flexion) create significant increases in carpal tunnel pressure. Accelerations from extension to flexion are thought to pose the greatest risk for CTS, and when the hand is in a wrist neutral position (i.e., no vertical or horizontal deviation) then there is minimum pressure on the tendons and the median nerve in the carpal tunnel. With occupational overuse of the fingers, minor trauma to the tendons and the sheaths may accumulate and eventually produce CTS.

As the tendons or their sheaths become irritated and inflamed, the resulting swelling increases the pressure on the median nerve, which initially causes tingling, then numbness, and eventually disabling pain when the fingers are moved. Computer users are particularly at risk because of the large number of finger movements which the fingers may make in a short time. For example, a data entry worker who averages 13,000 key strokes per hour will make over half-a-million finger movements per week. In short, the three major risk factors for CTS are poor posture, pressure in the carpal tunnel and lack of pauses to allow time for tissue repair.

The use of QWERTY keyboard layouts, which can cause some ulnar deviation of both hands, and a positive keyboard angle which places the hands in an extended posture, combine to increase the risks of CTS. Over time these factors accelerate the accumulation of trauma to the hands/wrists, and this cumulative trauma is now appearing as the epidemic of CTS cases. Also, QWERTY keyboards usually are asymmetrical (i.e., the numeric keyboard is to the right of the QWERTY keys) and users tend to center the keyboard on their screen rather than centering QWERTY on the screen. This can result in users sitting in, twisted postures which increase the risks of back, shoulder and neck problems.

To reiterate, the major contributing factors to the occurrence of CTS are believed to fall primarily within the categories of (i) poor posture, (ii) no or insufficient pauses during work, and (iii) undesirable pressures. "Poor posture" includes (i) wrist extension, (ii) hand deviation, and (iii) poor seated posture. "No or insufficient pauses" include (i) repetitive movements. (ii) no or inadequate micro-breaks, and (iii) impaired tissue repair. "Undesirable pressures" include those pressures resultant from (i) flexion/extension accelerations, (ii) increased carpal tunnel pressure, and (iii) increased tissue trauma.

Because of the significance of the CTS problem, a number of previous products have attempted to reduce CTS risks. First, the layout of data entry keyboards have been modified. Keyboard re-designs to minimize horizontal radial or ulnar deviation have been developed. However, the problem of vertical deviation (extension) remains even with these keyboards. Also, postural risks from using other input devices (e.g., mouse) are obviously unaffected by modification to keyboard layout.

Second, wrist rests have been provided. Each arm weighs about 2.5% of a human's total body weight. The ability to rest the wrists on a support helps to reduce muscular activity in the forearm and incidentally reduce pressure in the carpal tunnel. However, problems of flexion/extension and ulnar/radial deviation remain because of the design and slope of the keyboard. Moreover, wrist rests defeat the portability aspect of notebook computers since the notebook computer is designed to be light-weight and as peripheral- component-free as possible.

Third, full motion fore-arm supports have been provided. These products provide full motion fore-arm support for the worker. Each arm is rested in a mobile support which takes the arm weight for all horizontal movements. However, as with wrist rests, problems of flexion/extension and ulnar/radial deviation remain because of the design and angle of the keyboard, and in a short-term test the use of full motion fore-arm supports resulted in a slight slowing of typing speed. Again, these devices are not well suited for portable applications because they affect the portability aspects of the computer.

Accordingly, there is a need in the art for a portable computer that has an adjustable palm rest integrated into the chassis of the portable computer to allow the user to achieve a wrist-neutral position (i.e. where the wrist is substantially level with the palm) and thereby reduce the risk of CTS injury. In addition, the angle of the adjustable palm rest's orientation with respect to the plane of the keyboard can vary with different working environmental situations. The present invention provides a portable computer that addresses these needs.

SUMMARY OF THE INVENTION

To address the above-discussed deficiencies of the prior art, the present invention provides a portable computer having a palm rest integrated therein. In a preferred embodiment, the portable computer comprises a computer chassis having a side wall adjoining a bottom wall that forms a footprint of the chassis, a keyboard positioned toward a rear end of the chassis, and a cover member coveting a portion of an interior of the chassis. The portable computer further includes a palm rest integrated into the structure of the portable computer's chassis. The palm rest is comprised of a palm support that has front and rear ends and that is pivotable with respect to the chassis between a covering position and an elevated first palm support position. Preferably, the palm support is pivotable about a hinge that couples the palm support to the chassis. The palm rest further includes an adjustable extension structure having a first end coupled to the palm support and a second end coupled to a wall of the chassis. In a preferred embodiment, the adjustable extension structure is pivotally coupled to the palm support adjacent a front end of the palm support.

In a preferred embodiment, the hinge is comprised of a pin extending from a side edge of the rear end of the palm support and is received within a bearing that is coupled to the chassis. In this particular embodiment, the hinge preferably further includes a latch assembly that is slidably joined to a wall of the chassis. The latch assembly preferably has a detent formed therein that is positioned within the interior of the chassis and that functions as a bearing for releasably receiving the pin therein.

In another embodiment, the hinge is preferably comprised of a pin extending from a side edge of the front end of the palm support and is rotatably coupled to the first end of the extension structure. In this embodiment, the palm support is preferably pivotable about the hinge between the coveting position and a second palm support position outside the footprint of the chassis.

Another aspect of the present invention includes the presence of an adjustable locking mechanism associated with the extension structure to lock the palm support in the first palm support position. Preferably, the locking mechanism is comprised of an elongated member coupled to the extension structure and is lockingly engagable with a wall of the chassis.

The palm support may be pivotable about the hinge within the chassis' footprint to position the front end of the palm support above a plane of the keyboard when the palm support is in the first palm support position. In contrast, when the palm support is in the covering position, the palm support is substantially planar with the cover member.

In another preferred embodiment of the present invention, there is provided a portable computer having an integrated palm rest associated therewith. The portable computer comprises a computer chassis having a side wall adjoining a bottom wall that forms a footprint of the chassis, a keyboard positioned toward a rear end of the chassis and a cover member coveting an interior portion of the chassis. The portable also includes a palm support that has front and rear ends and that is pivotable between a coveting position and an elevated first palm support position. The portable computer further includes in this particular preferred embodiment a first hinge and a second hinge pivotally coupling the palm support to the chassis, and an extension structure having a first end coupled to the palm support and a second end coupled to a wall of the chassis.

Preferably, the first hinge is comprised of a pin extending from a side edge of the rear end of the palm support and received within a bearing coupled to the chassis. More preferably, however, the first hinge further comprises a latch assembly slidably joined to a wall of the chassis. The latch assembly has a detent formed therein and is positioned within the interior of the chassis for removably receiving the pin therein. The palm support is pivotable about the first hinge within the footprint to position the front end of the palm support above a plane of the keyboard when the palm support is in the first palm support position. In contrast, the palm support is substantially planar with the cover member when the palm support is in the covering position.

The second hinge is preferably comprised of a pin extending from a side edge of the front end of the palm support that is rotatably coupled to the first end of the extension structure. The palm support is pivotable about the second hinge between the covering position and a second palm support position outside of the footprint of the chassis.

In another aspect of this embodiment, the portable computer further comprises an adjustable locking mechanism associated with the extension structure to lock the palm support in the first palm support position.

In another aspect of this embodiment, the side wall of the chassis preferably has a slanted elongated slot formed therein, the locking mechanism is slidable along a path of the slanted elongated slot and is engagable with the side wall to secure the extension structure in a desired position along the path, and thus the palm support at a corresponding desired height. In another aspect, the locking mechanism is preferably comprised of an elongated member that extends into and is slidable along the slanted elongated slot.

A method of providing an ergonomic palm rest position for use with a portable computer having a chassis with a footprint, a keyboard positioned toward a rear end of the chassis and a cover member is also provided by the present invention. The method comprises the steps of moving a palm support having a front end and a rear end about a hinge coupling the palm support to the chassis between a covering position and a first palm support position, and extending an extension structure having a first end coupled to the palm support and a second end coupled to a wall of the chassis.

In another aspect of this embodiment, the method preferably comprises the step of locking the palm support in the first palm support position by an adjustable locking mechanism associated with the extension structure. The locking step preferably includes engaging an elongated member coupled to the locking mechanism with a wall of the chassis.

In another aspect of this embodiment, the moving step includes pivoting the palm support about a pin extending from a side edge of a rear end of the palm support and that is received within a bearing coupled to the chassis. Preferably, the step of moving the palm support further includes the step of removing the pin from a detent formed in a latch assembly coupled to the chassis.

In another aspect of the method, the step of moving includes the step of pivoting the palm support about a pin extending from a side edge of a front end of the palm support and that is rotatably coupled to the extension structure. In this particular aspect of the method invention, the method of pivoting preferably includes rotating the pin in the first end of the extension structure. Alternatively, the step of moving may further include the step of pivoting the palm support about the hinge between the covering position and a second palm support position.

In another aspect, the step of moving the palm support to the first palm support position preferably includes positioning the front end of the palm support above the plane of the keyboard within the footprint of the chassis.

In yet another aspect, the step of moving preferably includes the step of positioning the palm support substantially planar with the cover member.

In yet another embodiment of the method, there is provided a method of providing an ergonomic palm rest position for use with a portable computer, comprising the steps of moving a palm support having front and rear ends about a first hinge and a second hinge between a covering position and a first palm support position with respect to a portable computer chassis. The portable computer chassis has a footprint, a side wall adjoining a bottom wall forming an interior portion thereof and a cover member covering a first portion of the interior portion. The cover member includes a keyboard positioned toward a rear end of the portable computer chassis. This method also includes the step of extending an extension structure having a first end coupled to the palm support and a second end coupled to a wall of the chassis.

In another aspect, this method further comprises the step of locking the palm support in the first palm support position by an adjustable locking mechanism associated with the extension structure. Preferably the locking step includes the step of sliding an elongated member of the locking mechanism coupled to the extension structure along a slanted elongated slot formed in the side wall of the chassis and engaging the elongated member with the side wall of the chassis.

In yet another aspect of this method, the moving step preferably includes pivoting the palm support about a pin extending from a side edge of the rear end of the palm support and coupled to the chassis. More preferably, however, the step of moving the palm support includes the step of releasing the pin from a detent formed in a latch assembly coupled to the chassis.

In yet another aspect of this method, the step of moving about the first hinge includes rotating a pin extending from a side edge of the front end of the palm support in the first end of the extension structure.

In yet another aspect of this method, the step of moving to the second palm support position includes pivoting the palm support outside the footprint of the chassis.

In another aspect, the step of pivoting the palm support to the first palm support position includes the step of positioning the front end of the palm support above the plane of the keyboard within the footprint, and in yet another aspect, the step of moving includes the step of positioning the palm support in a substantially planar position with the cover member.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
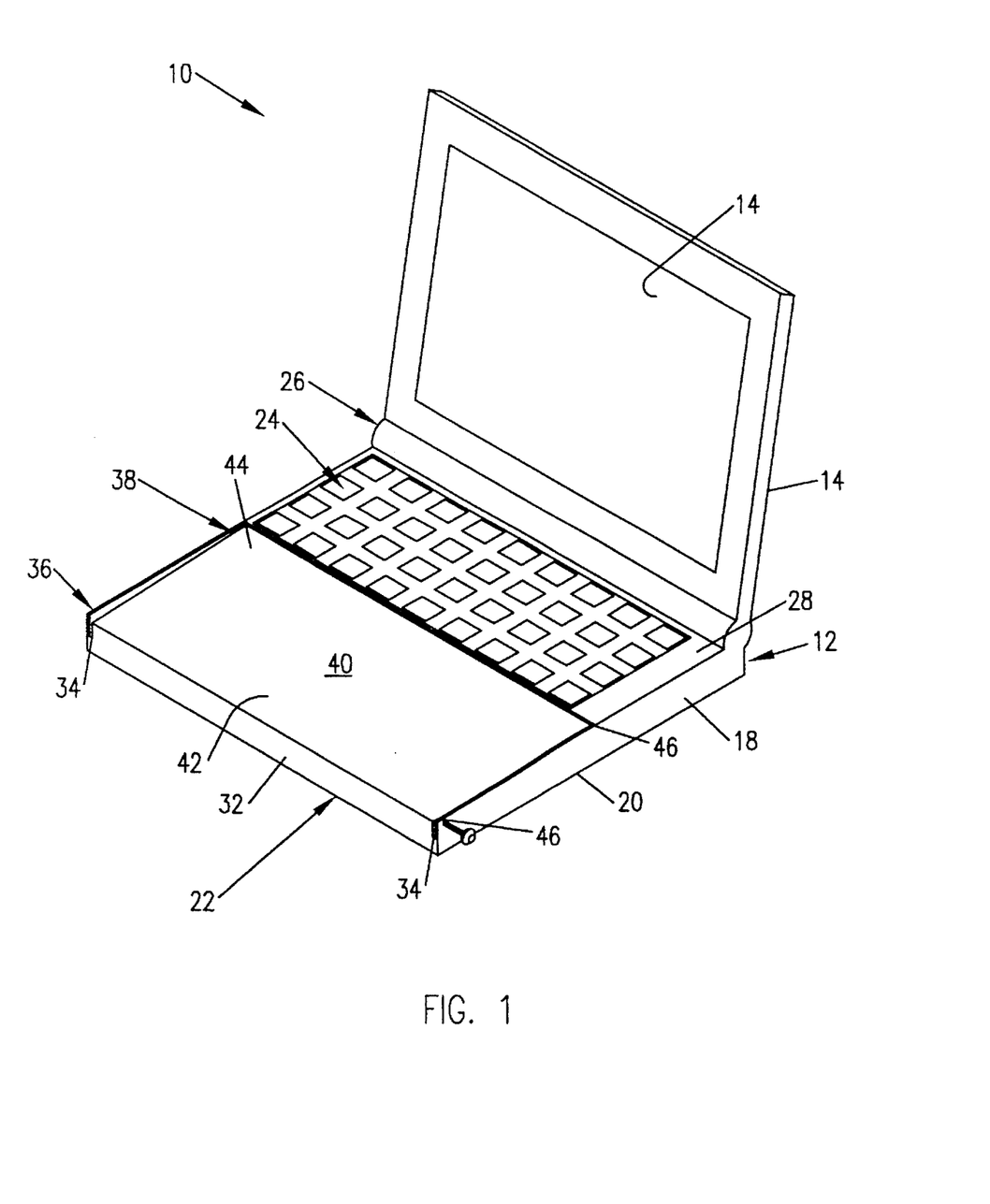
FIG. 1 illustrates a perspective isometric view of the portable computer and integrated palm rest with the palm support the covering position.
Figure 1A:
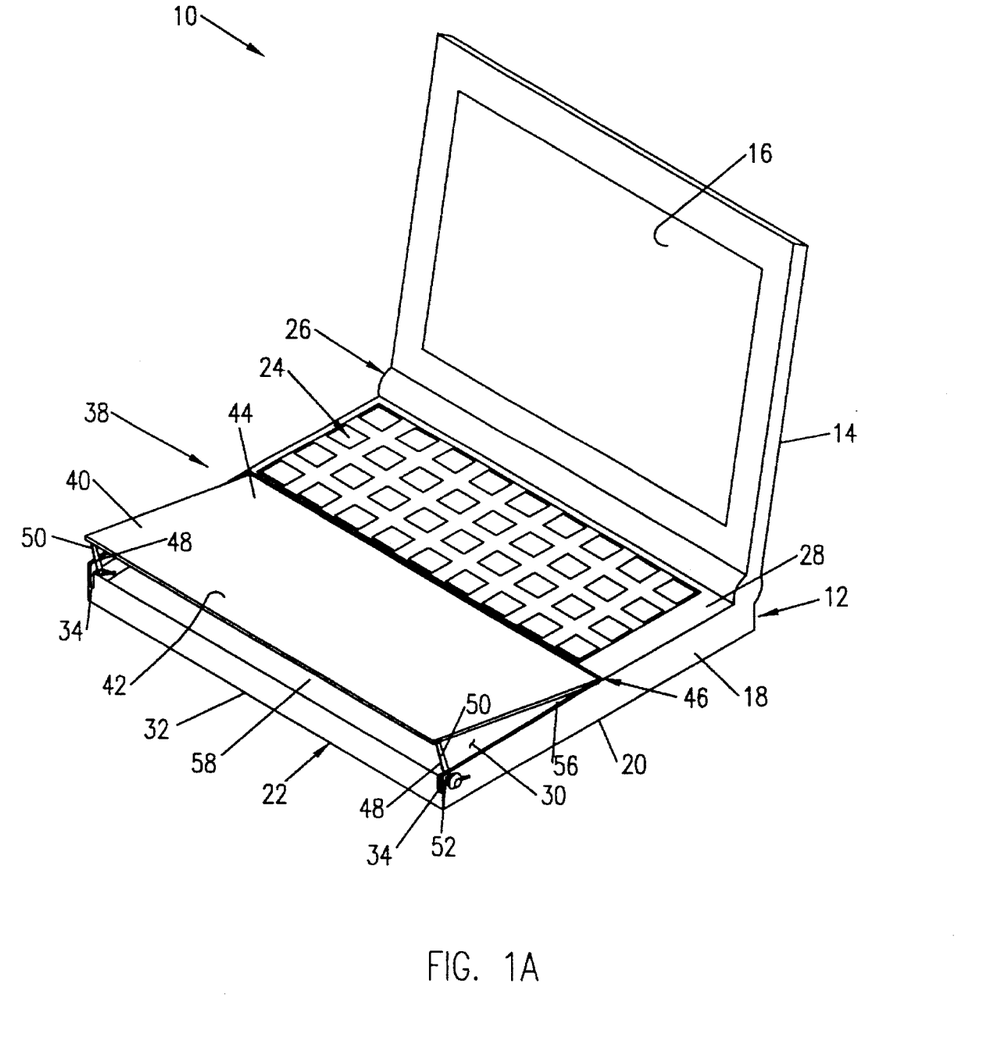
FIG. 1A illustrates a perspective isometric view of the portable computer and integrated palm rest with the palm support in the first palm support position.

Referring initially to FIGS. 1 and 1A, in a preferred embodiment thereof, there is illustrated a perspective isometric view of the portable computer 10. The portable computer 10 is comprised of a computer chassis 12 with a lid 14 pivotally attached thereto and having a screen 16 incorporated therein. The computer chassis 12 has a side wall 18 adjoining a bottom wall 20 that forms a footprint 22 of the computer chassis 12, a keyboard 24 positioned toward a rear end 26 of the computer chassis 12, and a cover member 28 covering a portion of an interior 30 of the computer chassis 12 in which conventional electrical components (not shown) are housed. A front side wall 32 has extension structure slots 34 formed therein on opposite sides of the computer chassis 12 whose function will be discussed in more detail below. Positioned over a front portion 36 of the computer chassis 12 is a palm rest 38. The palm rest 38 is comprised of a generally rectangular palm support 40 whose length and width is sufficient to cover the front portion 36 of the computer chassis 12. The palm support 40 has front and rear ends 42,44 and is pivotable with respect to the computer chassis 12 between a covering position as shown in FIG. 1 and an elevated first palm support position as shown in FIG. 1A. The palm rest 38 further includes a hinge 46 that pivotally couples the palm support 40 to the computer chassis 12. As discussed below, hinge 46 may be on either the front or rear ends 42,44 of the palm support 40 or it may be on both. In a preferred embodiment, the hinges are positioned on both sides of both the front and rear ends 42,44. An adjustable extension structure 48 that has a first end 50 coupled to the palm support 40 and a second end 52 preferably coupled to the side wall 18 of the computer chassis 12. Of course, it will be appreciated that the extension support 48 could also be positioned on the front side wall 32, if so desired.

While a preferred embodiment of the hinge 46 is as discussed below with respect to FIGS. 2 and 3, it should be understood that for the purposes of the present invention, the hinge may also be simply a point about which the palm support 40 pivots or rotates and need not include a mechanical structure. For example, as shown in FIG. 1A, the underside 56 of the rear end 44 of the palm support 40 may have a beveled face configuration such that it overlaps a portion of the cover member 28. The overlap between the beveled face and the cover member 28 allows the rear end 44 to function as a hinge as the front end 42 is elevated to a plane above the keyboard 24 (i.e. to a position above the height of the keys). Another aspect of the present invention includes a second hinge, which will be discussed below with reference to FIGS. 2 and 3.

Within the interior 30 of the chassis' front portion 36 is a protective sub-covering member 58 to prevent dust and other debris from the surrounding environment for depositing on the sensitive electrical components within the computer chassis 12 when the palm support 40 is in a raised position.

The elevated position of the palm support 40 above the plane of the keyboard 24 provides a wrist-neutral position (i.e. the wrists are not substantially angled up or down, but are substantially level with the fingers) that lessens the strain on the user's wrists and forearms, thereby reducing or eliminating CTS injury. When conventional portable computers are operated from the lap of the user, the user must angle his wrists at a very unnatural angle to reach the keyboard. This unnatural wrist position may cause CTS when typing is done over long periods of time or may exacerbate a user's pre-existing CTS injury. In contrast, the palm rest 38 of the present invention is particularly beneficial when the portable computer 10 is operated from the lap of the user because the palm support 40 provides a raised support for the palms, which allows the user to maintain the beneficial wrist-neutral position previously mentioned.

Figure 2:
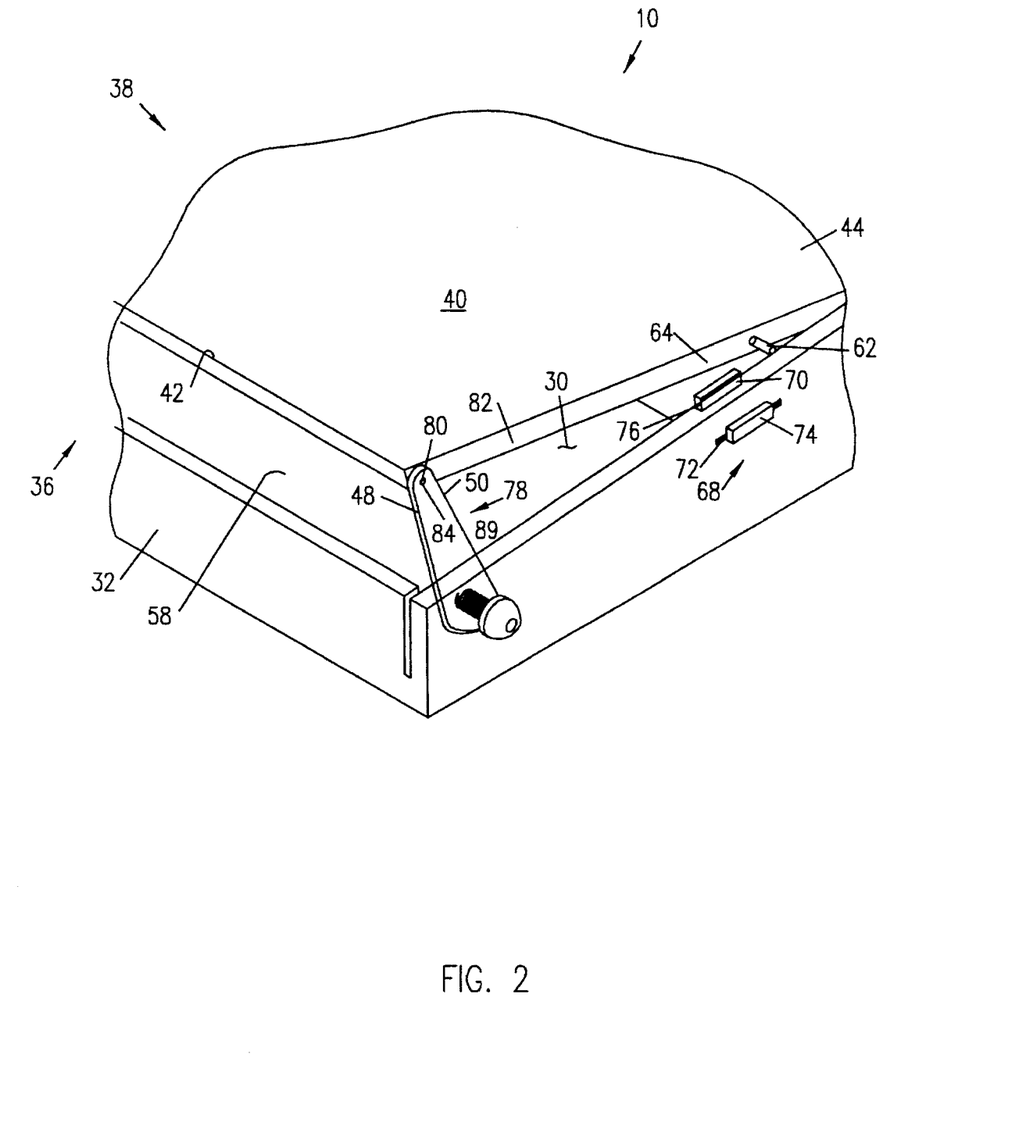
FIG. 2 illustrates an enlarged perspective isometric view of the extension structure, locking mechanism and the latch assembly.

Turning now to FIG. 2, there is illustrated an enlarged view of the front portion 36 of the computer chassis 12 with the palm rest 38 of the present invention integrated therein. This particular figure illustrates two alternate embodiments of the hinge 46 discussed above for FIG. 1A. In a preferred embodiment, a first hinge 60 is comprised of a pin 62 extending from a side edge 64 of the rear end 44 of the palm support 40 and is receivable within a bearing 66 (partially shown in phantom) coupled to the computer chassis 12. Preferably, the bearing 66 is a latch assembly 68 having a detent 70 formed therein positioned within the interior 30 of the computer chassis 12 and configured to releasably receive the pin 62 therein. The pin 62 is shown disengaged from the detent 70 for purposes of a clearer illustration. However, when the pin 62 is received within the detent 70, the pin 62 is securely recaptured and rotatably held in place such that the front end 42 of the palm support 40 can be rotated upwardly as shown. The latch assembly 68 is preferably slidably engaged within a latch assembly slot 72 formed through the side wall 18 of the computer chassis 12. In a preferred embodiment, the latch assembly 68 has an outer grip 74 that the user may grasp to move the latch assembly 68 in a reciprocal motion with respect to the latch assembly slot 72. The outer grip 74 is coupled to a latch member 76 in which the detent 70 is formed and positioned within the interior 30 of the computer chassis 12. As the outer grip 74 is reciprocated within the latch assembly slot 72, the pin 62 is disengaged from the detent 70, which allows the rear end 44 of the palm support 40 to be lifted upwardly from the computer chassis 12 as shown.

In an alternate embodiment, the hinge 46 (FIG. 1A) may be a second hinge 78 comprised of a pin 80 extending from a side edge 82 of the front end 42 of the palm support 40 and rotatably coupled to the first end 50 of the extension structure 48. The second hinge 78 allows the palm support 40 to be pivoted to a second palm position as illustrated in FIG. 3.

Prior to being pivoted to the second palm, the front end 42 of the palm support 40 is preferably substantially planar with the cover member 28 and covering the front portion 36 of the computer chassis 12 (see FIG. 1). What is meant by "substantially planar" is that the palm support 40 lies basically in the same plane as the cover member 28 with the exception of variances attributable to design tolerance variances. As previously mentioned, the first end of the extension structure 34 is coupled to the pin 80. Preferably, the pin 80 is received in a pin aperture 84 formed in the first end 50 of the extension structure 34. The second end 52 of the extension structure 34 is coupled to the side wall 18 of the computer chassis 12 via a locking mechanism 86 that is associated with the extension structure 48. The locking mechanism 86 is preferably comprised of an elongated member 88 having one end coupled to the second end 52 of the extension structure 48 and an opposite end that extends outwardly through the side wall 18 of the computer chassis 12. Preferably, the elongated member 88 is a bolt having threads on at least the end that extends through the side wall 18, and which is surrounded by a spring 89. The spring 89 acts to force the knob 90 and the bolt 88 to stay in a locked position. The threads threadedly engage corresponding threads on a compression knob 90, which allows the compression knob 90 to compress against the side wall 18 and secure the extension structure 48 in a selected vertical position. In a preferred embodiment, the side wall 18 of the computer chassis 12 has a slanted slot 92 formed in which the locking mechanism 86 is slidably engaged. The slanted slot 92 is preferably formed within the side wall 18 at an angle and length sufficient to allow the extension structure 48 to be fully extended. Thus, it can be seen from FIG. 2 and the foregoing description that the extension structure 48 and the locking mechanism 86 can be slid along the slanted slot 92 until the desired height of the front end 42 of the palm support 40 is achieved. This allows for the palm support 40 to be adjusted to different heights to accommodate different users as well as different operating conditions.

While a preferred locking mechanism has just been described, it will be appreciated by those of skill in the art that many different types of locking mechanisms may be substituted in place of the threaded elongated member 88 and the compression knob 90. For example, the compression knob 90 may be replaced with a flat button that is designed to traverse the length of the slanted slot 92. The slanted slot 92 may have spaced apart notches formed therein along its path that allow the extension structure 48 to be registered via the flat button in the notch that corresponds to the desired height. When the user desires to adjust the height of the extension structure, the button could be pressed, thereby allowing the extension structure to be moved along the slanted slot 92 to the desired height. The user could then slide the button along the track of the slanted slot until the desired height is achieved and then release the button causing locking mechanism to re-engage the appropriate notch. The foregoing as been set forth by way of example only as to how the locking mechanism could be changed. Many other variations know to those skilled in the art could be used as well.

Additionally, in a preferred embodiment, the front side wall 18 of the computer chassis 12 has the extension structure slots 34 formed on opposite sides thereof for the purpose of allowing the extension structure 48 to move down through the extension structure slots 94 while it is in an extended position. This is necessary in this particular embodiment when pivoting the palm support 40 to the second palm rest position outside the footprint 22 of the computer chassis 12. It should, of course, be appreciated that the hinge assemblies discussed above may be positioned on both sides of the front and rear ends 42,44 of the palm support 40.

Figure 3:
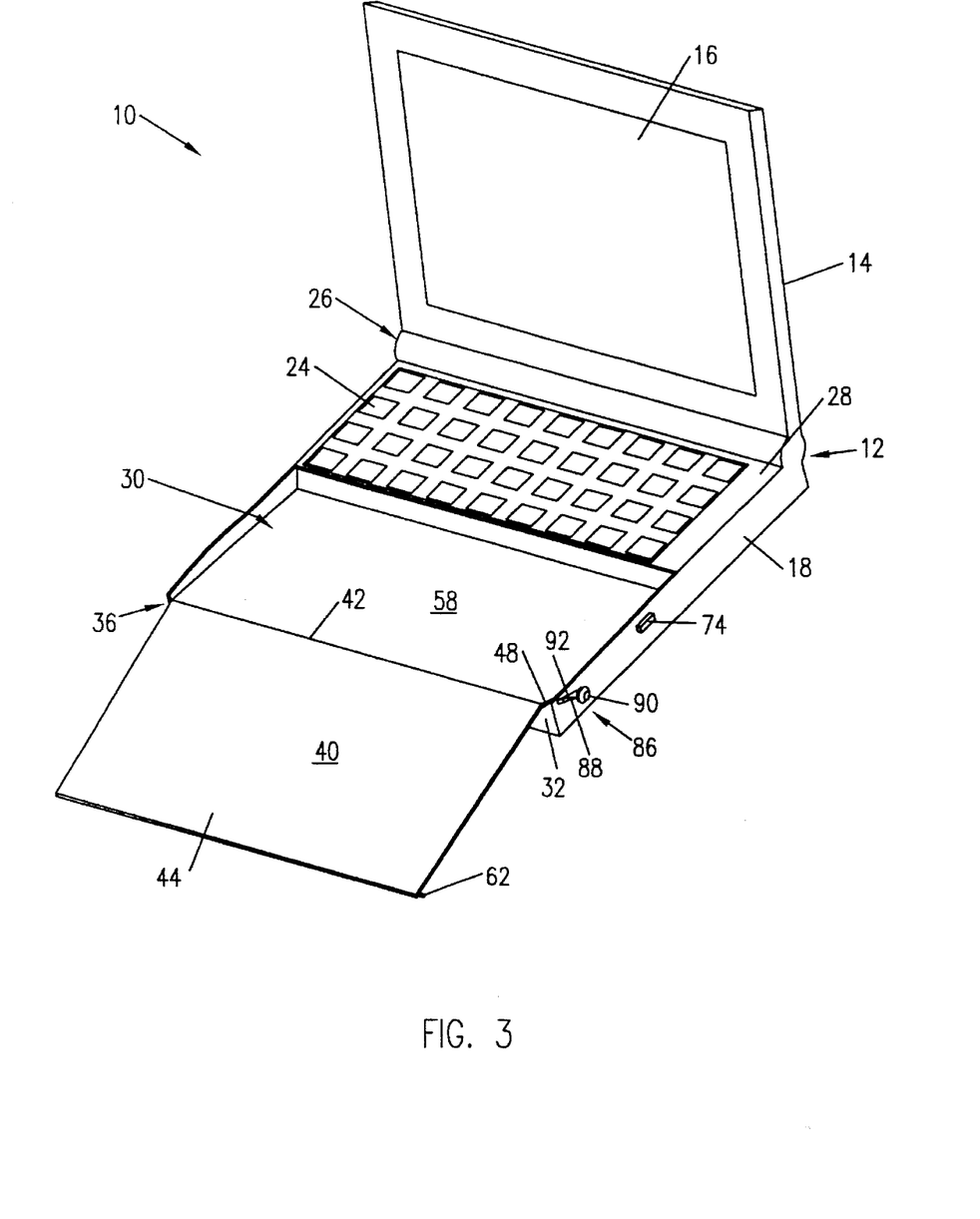
FIG. 3 illustrates a perspective isometric view of the portable computer and integrated palm rest with the palm support in the second palm support position.

Turning now to FIG. 3, there is illustrated a portable computer 10 with the integrated palm support 40 in the second palm support position. This position is preferred when the portable computer 10 has been placed on a hard surface, such as a desk top. The pin 62 is released from the latch assembly 68, and the palm support 40 is rotated outwardly away from the portable computer 10 via the second hinge 78. When in this position, the palm support 40 provides additional support for the user's wrists and palms, thereby lessening user wrist strain. The distance illustrated between the palm support 40 and the keyboard 24 is slightly exaggerated for illustration purpose. However, it should be understood that the user would be able to rest his palms on the palm support 40 and easily reach the keyboard 24 with his or her fingers without unnecessary strain.

With the present invention described, a method of the way in which it works will now be set forth with general reference to FIGS. 1–3. Generally, the portable computer will be in a closed-transport configuration with the lid member covering the chassis. The portable computer will be opened to an operating position. If the portable computer will be operated from the lap of the user, the user may wish to elevate the palm support such that places his wrists in a wrist-neutral position to reduce the risk of CTS injury. Since the portable computer was previously in a closed-transport position, the front end of the palm support will be substantially planar with the keyboard. As such, the elongated member and the compression knob will be as the bottom end of the slanted slot causing the extension structure to be in a fully retracted position. Thus, the user must adjust the palm support upwardly to achieve a wrist-neutral operating position if the portable computer is to be operated from the user's lap. To do so, the user, in a preferred embodiment, will elevate the palm support by pressing the button 90 in, which forces the bolt 88 out of the detent. The button 90 is then slid up and released at the desired position.

Once the tension is released, the user moves the locking mechanism, which includes the elongated member coupled to the extension structure, upwardly along the path of the slanted slot. This upward movement, in turn, extends upwardly the extension structure and the front end of the palm support to which it is coupled above the keyboard (i.e. above the upper ends of the keys). Because the pin on the rear end of the palm support is secured by the latch mechanism, the rear end of the palm support stays substantially planar with cover member of the chassis and acts as a hinge or pivot point as the front end of the palm support is raised to a wrist-neutral position within the footprint of the computer. The user continues to adjust the height until a wrist-neutral position for that particular user is achieved. It will, of course, be recognized that the wrist-neutral position will vary from one user to another. However, since the height of the palm support is completely adjustable, varying heights can be achieved. When the desired position is achieved, the user then tightens the compression knob against the side wall of the chassis via the threaded elongated member. Once use of the portable computer is complete, the palm support is returned to its covering position substantially planar position with the cover member.

If it is desired to use the portable computer on a hard surface such as a desk of computer table, the user may wish to extend the palm support to a second palm position that is outside the footprint of the chassis. Again, if the portable computer has just been opened, the palm support will be substantially planar with the covering member with the locking assembly at the bottom end of the slanted slot and the extension structure in a fully retracted position. The pin on the rear end of the palm support will be engaged in the detent of the latch assembly. To achieve the desired position, the user will slide the latch assembly to disengage the detent from the pin. The rear end of the palm support assembly will then be free to rotate about the pin on the front end of the palm support that is received within the extension structure. The user pivots the palm support outside footprint of the chassis until the rear end of the palm support engages the surface firm support surface, such as the desk or computer table. As this is done, the extension structure pivots about the locking assembly and extends through the extension structure slots, which allows the front end of the palm support to be substantially level with the front end of the chassis. Once use of the portable computer is complete, the palm support is returned to its covering position.

From the above description, it is apparent that the present invention provides a portable computer having a palm rest integrated therein that allows the user to maintain a wrist-neutral position when using the portable computer. In a preferred embodiment, the portable computer comprises a computer chassis having a side wall adjoining a bottom that forms a footprint of the chassis, a keyboard positioned toward a rear end of the chassis, and a cover member covering a portion of an interior of the chassis. The portable computer further includes a palm rest integrated into the structure of the portable computer's chassis. The palm rest is comprised of a palm support that has front and rear ends and that is pivotable with respect to the chassis between a covering position and an elevated first palm support position. Preferably, the palm support is pivotable about a hinge, that couples the palm support to the chassis. The palm rest further includes an adjustable extension structure having a first end coupled to the palm support and a second end coupled to a wall of the chassis. Preferably, the adjustable extension is pivotally coupled to the palm support adjacent a front end of the palm support.

Although the present invention and its advantages have been described in detail, those skilled in the art should understand that they can make various changes, substitutions and alterations herein without departing from the spirit and scope of the invention in its broadest form.

What is claimed is:

1. A portable computer having a palm rest integrated therein, comprising:

a computer chassis having a side wall adjoining a bottom that forms a footprint of said chassis, a keyboard positioned toward a rear end of said chassis, and a cover member covering a portion of an interior of said chassis;

a palm support having front and rear ends and pivotable with respect to said chassis between a covering position and an elevated first palm support position;

a hinge pivotally coupling said palm support to said chassis; and an adjustable extension structure having a first end coupled to said palm support and a second end couplable to a wall of said chassis.

2. The portable computer of claim 1 wherein said hinge is comprised of a pin extending from a side edge of said rear end of said palm support and received within a bearing coupled to said chassis.

3. The portable computer of claim 2 wherein said hinge further comprises a latch assembly slidably joined to a wall of said chassis, said latch assembly having a detent formed therein and positioned within said interior of said chassis for releasably receiving said pin therein.

4. The portable computer of claim 1 wherein said extension structure is pivotally coupled to said palm support adjacent a front end of said palm support.

5. The portable computer of claim 1 wherein said hinge is comprised of a pin extending from a side edge of said front end of said palm support and rotatably coupled to said first end of said extension structure.

6. The portable computer of claim 1 wherein said palm support is pivotable about said hinge between said covering position and a second palm support position outside of said footprint of said chassis.

7. The portable computer of claim 1 further comprising an adjustable locking mechanism associated with said extension structure to lock said palm support in said second palm support position.

8. The portable computer of claim 7 wherein said locking mechanism is comprised of an elongated member coupled to said extension structure and lockingly engagable with a wall of said chassis.

9. The portable computer of claim 1 wherein said palm support is pivotable about said hinge within said footprint to position said front end of said palm support above a plane of said keyboard when said palm support is in said first palm support position.

10. The portable computer of claim 1 wherein said palm support is substantially planar with said cover member when said palm support is in said covering position and covers a portion of said interior of said chassis.

11. A method of providing an ergonomic palm rest position for use with a portable computer having a chassis with a footprint, a keyboard positioned toward a rear end of said chassis and a cover member, said method comprising the steps of:

moving a palm support having a front end and a rear end about a hinge coupling said palm support to said chassis between a covering position and a first palm support position; and extending an extension structure having a first end coupled to said palm support and a second end coupled to a wall of said chassis.

12. The method of claim 11 further comprising the step of locking said palm support in said first palm support position by an adjustable locking mechanism associated with said extension structure.

13. The method of claim 12 wherein said locking step includes engaging an elongated member coupled to said locking mechanism with a wall of said chassis.

14. The method of claim 11 wherein said moving step includes pivoting said palm support about a pin extending from a side edge of a rear end of said palm support and received within a bearing coupled to said chassis.

15. The method of claim 11 wherein said step of moving said palm support includes the step of removing said pin from a detent formed in a latch assembly coupled to said chassis.

16. The method of claim 11 wherein said step of moving includes the step of pivoting said palm support about a pin extending from a side edge of a front end of said palm support and rotatably coupled to said extension structure.

17. The method of claim 16 wherein said step of pivoting includes rotating said pin in said first end of said extension structure.

18. The method of claim 16 wherein said step of moving further includes the step of pivoting said palm support about said hinge between said covering position and a second palm support position.

19. The method of claim 11 wherein said step of moving said palm support to said first palm support position includes positioning said front end of said palm support above the plane of said keyboard within said footprint of said chassis.

20. The method of claim 1 wherein the step of moving includes the step of positioning said palm support substantially planar with said cover member.

21. A portable computer having an integrated palm rest associated therewith, comprising:

a computer chassis having a side wall adjoining a bottom wall that forms a footprint of said chassis, a keyboard positioned toward a rear end of said chassis and a cover member covering an interior portion of said chassis;

a palm support having front and rear ends and pivotable between a covering position and an elevated first palm support position;

a first hinge and second hinge pivotally coupling said palm support to said chassis; and an extension structure having a first end coupled to said palm support and a second end coupled to a wall of said chassis.

22. The portable computer of claim 21 wherein said first hinge is comprised of a pin extending from a side edge of said rear end of said palm support and received within a bearing coupled to said chassis.

23. The portable computer of claim 21 wherein said first hinge further comprises a latch assembly slidably joined to a wall of said chassis, said latch assembly having a detent formed therein and positioned within said interior of said chassis for removably receiving said pin therein.

24. The portable computer of claim 21 wherein said second hinge is comprised of a pin extending from a side edge of said front end of said palm support and rotatably coupled to said first end of said extension structure.

25. The portable computer of claim 21 further comprising an adjustable locking mechanism associated with said extension structure to lock said palm support in said first palm support position.

26. The portable computer of claim 25 wherein said side wall of said chassis has a slanted elongated slot formed therein, said locking mechanism slidable along a path of said slanted elongated slot and engagable with said side wall to secure said extension structure in a desired position along said path.

27. The portable computer of claim 26 wherein said locking mechanism is comprised of an elongated member that extends into and is slid able along said slanted elongated slot.

28. The portable computer of claim 21 wherein said palm support is pivotable about said second hinge between said covering position and a second palm support position outside of said footprint of said chassis.

29. The portable computer of claim 21 wherein palm support is pivotable about said first hinge within said footprint to position said front end of said palm support above a plane of said keyboard when said palm support is in said first palm support position.

30. The portable computer of claim 21 wherein said palm support is substantially planar with said cover member when said palm support is in said covering position and covers a portion of said interior of said chassis.

31. A method of providing an ergonomic palm rest position for use with a portable computer, comprising the steps of:

moving a palm support having front and rear ends about first and second hinges between a covering position and first and second palm support positions with respect to a portable computer chassis, said portable computer chassis having a side wall adjoining a bottom wall forming a footprint and an interior portion thereof and a cover member covering a first portion of said interior portion, said cover member including a keyboard positioned toward a rear end of said portable computer chassis; and extending an extension structure having a first end coupled to said palm support and a second end coupled to a wall of said chassis.

32. The method of claim 31 further comprising the step of locking said palm support in said first palm support position by an adjustable locking mechanism associated with said extension structure.

33. The method of claim 32 wherein said locking step includes the step of sliding an elongated member of said locking mechanism coupled to said extension structure along a slanted elongated slot formed in said side wall of said chassis and engaging said elongated member with said side wall of said chassis.

34. The method of claim 31 wherein said moving step includes pivoting said palm support about a pin extending from a side edge of said rear end of said palm support and coupled to said chassis.

35. The method of claim 34 wherein said step of moving said palm support includes the step of releasing said pin from a detent formed in a latch assembly coupled to said chassis.

36. The method of claim 31 wherein said step of moving said palm support about said first hinge includes rotating a pin extending from a side edge of said front end of said palm support in said first end of said extension structure.

37. The method of claim 31 wherein said step of moving to said second palm support position includes pivoting said palm support outside said footprint of said chassis.

38. The method of claim 31 wherein said step of pivoting said palm support to said first palm support position includes the step of positioning said front end of said palm support above the plane of said keyboard within said footprint.

39. The method of claim 31 wherein the step of moving includes the step of positioning said palm support in a substantially planar position with said cover member.

* * * * *